(No Model.)

W. A. OTTO & W. O. ZIMMERMAN.
SEWING MACHINE BRAKE.

No. 354,516. Patented Dec. 14, 1886.

Witnesses.
E. R. Watters.
Frank L. Clark

Inventors.
William A. Otto and
W. Orville Zimmerman,
By Justus M. St. John,
Their Atty.

UNITED STATES PATENT OFFICE.

WILLIAM A. OTTO AND W. ORVILLE ZIMMERMAN, OF CEDAR RAPIDS, IOWA; SAID ZIMMERMAN ASSIGNOR TO BENJ. A. METCALF, OF SAME PLACE.

SEWING-MACHINE BRAKE.

SPECIFICATION forming part of Letters Patent No. 354,516, dated December 14, 1886.

Application filed January 16, 1886. Serial No. 188,739. (No model.)

*To all whom it may concern:*

Be it known that we, WILLIAM A. OTTO and W. ORVILLE ZIMMERMAN, citizens of the United States, residing at Cedar Rapids, in the county of Linn and State of Iowa, have invented certain new and useful Improvements in Sewing-Machine Brakes, of which the following is a specification.

The object of our invention is to improve the construction of brakes for sewing and like machines, so as to admit of the attachment of the brake under the table and clear of the floor; to provide for the easy operation and adjustment of the same, and in general to render the brake more efficient than those hitherto devised.

The invention consists in the construction, arrangement, and adaptation of the parts, as will be hereinafter fully set forth and described.

Figure 1:
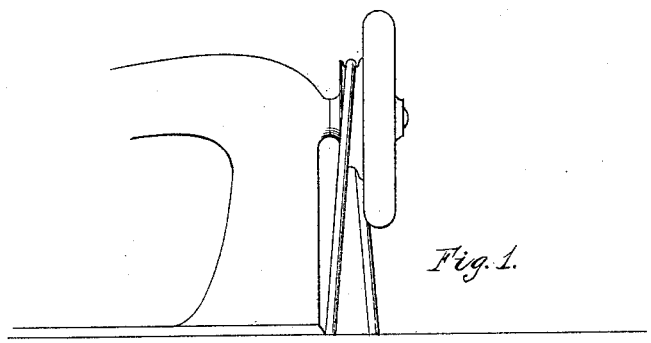
Figure 2:
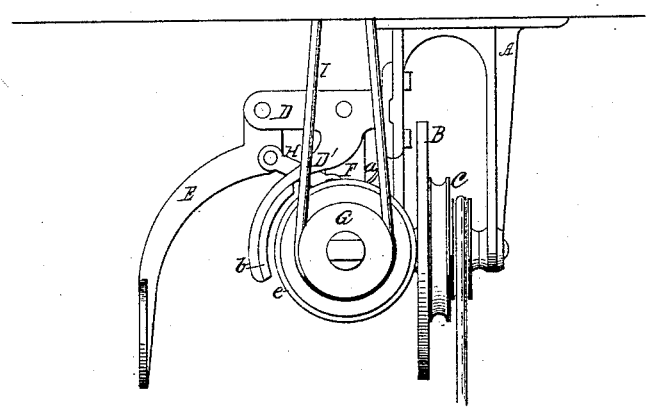
Figure 2:
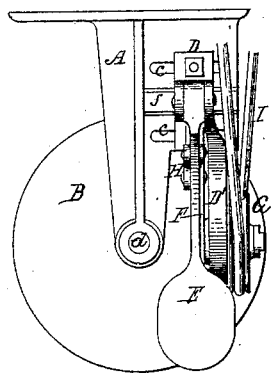
Figure 3:
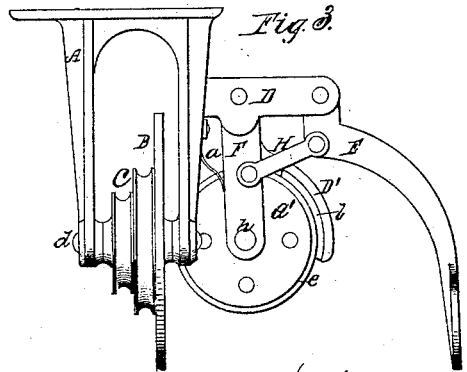

In the accompanying drawings, forming a part of this application, Figure 1 represents a side elevation of the invention as applied to a sewing-machine table; Fig. 2, a side elevation of the same, and Fig. 3 a rear elevation thereof.

Similar letters of reference indicate corresponding parts.

The invention is designed to be applied to the under side of a table or bench upon which are set a number of sewing-machines or other machines requiring an intermittent motion and to serve as a motion transmitter and brake. Being separate from the line-shaft, it also acts as a counter-shaft, and may be made the means for imparting a motion to the machinery greater or less than that of the line-shaft, as may be desired. In the case of sewing-machines it is generally desirable to greatly increase the speed of the machine beyond that of the line-shaft, and one of the objections to the common brake attached to the line-shaft which we wish to overcome is the difficulty of securing a high enough speed for many classes of work and a quick enough starting and stopping of the machines. It is also desirable to disconnect the brake entirely from the floor and to operate the same with the knee instead of the foot, as this arrangement not only clears the floor, making it easier to keep it clean, but also avoids the discomfort of a cold treadle common to other brakes. Other points of advantage will be apparent from the following description of the invention:

To the under side of the machine-table is attached a hanger, A, which is preferably of the stirrup form represented. A short shaft, *d*, is tightly fitted to the lower end of the hanger and serves as a bearing for the loosely-mounted disk and pulley B C, which are connected by belt direct with the line-shaft. In practice we make this disk and the cone-pulleys all in one piece, thus securing the greatest simplicity in construction and economy of space. The added length of the hub of the pulley also serves to give a long bearing for the disk, thereby the better enabling it to resist lateral pressure. The upper part of the limb of the hanger next the disk is extended, as shown in Fig. 2, and provided with horizontal slots *c c* and a suitable guide-rib, *f*. To this part of the hanger is attached, by suitable bolts, a bracket, D, from the under side of which extends an arm, D', curved outwardly, so as to serve as a brake for the friction-pulley A', mounted at the lower end of arm F, pivoted in the upper part of the bracket. For this purpose the inner face of the arm D', contiguous to the rim of the friction-pulley, is shod with leather or other suitable material.

In the construction of the friction-pulley we make the part *e*, which bears against the face of the disk and the brake, of paper, the same being sufficiently elastic for the purpose and as durable as rawhide, while at the same time much cheaper. In practice we use disks of paper fastened between two iron flanges under strong pressure. It will be seen that the pulley is suspended midway between the disk B and the brake D'. A spring, *a*, fastened to the bracket at the upper end and bearing against the pivoted arm F, tends to throw the pulley over against the brake, and this is its normal position. To secure the opposite movement, the device is provided with a knee-lever, E. As the movement is but slight, while considerable power is required to overcome the resistance of the spring and the inertia of the machinery, a compound leverage is secured by means of the link H, connecting the knee-lever and the pulley-support, as will be evident from an examination of Fig. 3. The friction-wheel and cone are made integral for the same reasons stated with respect to the disk and cone-pulleys, and is mounted on a stud, $h$, secured to the arm F.

It will be seen that the invention is of compact form, occupying but little space under the table, and is at the same time adapted to secure any desired rate of speed in the machines and an almost instantaneous starting and stopping thereof. As before stated, it is entirely clear of the floor, thus making it easy and convenient to sweep the same. It will also be evident that the short distance which the friction-pulley has to traverse in connection with the simple but powerful knee lever renders the action of the brake prompt and easy. Indeed, in this respect we have found the results much more satisfactory than in the case of a brake in which the motion is started and stopped by means of the common double-acting treadle and the more complicated mechanism made necessary by its application. Furthermore, the mode of mounting the friction-pulley is such as to produce a minimum of friction in its connective parts during its reciprocal movement. Instead of being pivoted so as to move in a horizontal plane, thus requiring the downward pressure of some part to resist the lift of the belt, and the consequent friction of such part, our friction-pulley swings in a vertical plane, the pivot of the pendulum-arm itself resisting the lifting action of the belt and the movement of the parts being opposed by the slightest possible degree of friction. In mechanism where the highest perfection in the action of the parts is very desirable we regard this as a substantial improvement over other devices for the same purpose.

It is designed that the brake shall be placed directly under the belt-wheel of the machine, to be operated by it, as represented in Fig. 1.

Referring now to Fig. 2, it will be apparent that the adjustment of the friction-pulley bracket may be made without materially changing the distance between this pulley and the belt-wheel of the machine, and therefore without any lengthening or shortening of the belt. The object of this adjustment is, of course, to regulate the speed of the machine without reference to the speed of the line-shaft or the disk-pulley. It will also be apparent that while the pendulum-arm swings in a vertical plane the friction-pulley itself moves in the arc of a circle practically at right angles to the longitudinal direction of the belt. Consequently the belt is as tight at one limit of the pulley's movement as at the other, and equally adapted by reason of such tightness to start or to stop the motion of the machine.

As it is common to transmit motion by means of a friction-wheel opposed to the face of a disk, we make no broad claim to that combination in its present application; but What we do claim as new, and desire to secure by Letters Patent, is—

1. In a sewing-machine brake, the combination of the hanger A, adapted to carry a disk-wheel at or near the lower end, and having one of its limbs laterally extended parallel with the face of the disk, and a bracket, D, mounted and horizontally adjustable on said hanger in a line parallel with the face of the disk, a pendulum-arm pivoted to said bracket and swinging in a vertical plane transversely to the face of the disk, and adapted to carry a friction-pulley mounted transversely to the disk-wheel, substantially as and for the purpose set forth.

2. The combination of the hanger A, having the axis $d$, the bracket D, horizontally adjustable in a line transverse to the axis $d$, and having the brake-arm D', the pendulum-arm pivoted in said bracket and adapted to swing in a vertical plane and carry the friction-wheel $e$ A', set transversely to the disk-wheel B C, the knee-lever E, and spring $a$, all constructed, arranged, and operating substantially as and for the purpose set forth.

In testimony whereof we affix our signatures in presence of two witnesses.

WILLIAM A. OTTO.
W. ORVILLE ZIMMERMAN.

Witnesses:
BEN. A. METCALF,
FRANK G. CLARK.